(12) United States Patent
Fukutome et al.

(10) Patent No.: US 11,945,673 B2
(45) Date of Patent: Apr. 2, 2024

(54) DOCUMENT FEEDER AND IMAGE FORMING APPARATUS

(71) Applicant: SHARP KABUSHIKI KAISHA, Sakai (JP)

(72) Inventors: Shohichi Fukutome, Sakai (JP); Kenji Kuroda, Sakai (JP); Hironori Ogasawara, Sakai (JP); Hisashi Yamanaka, Sakai (JP); Toshiki Fukunishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/109,966

(22) Filed: Feb. 15, 2023

(65) Prior Publication Data

US 2023/0192433 A1 Jun. 22, 2023

Related U.S. Application Data

(62) Division of application No. 17/708,430, filed on Mar. 30, 2022, now Pat. No. 11,608,241, which is a
(Continued)

(30) Foreign Application Priority Data

Oct. 17, 2018 (JP) .................................. 2018-195951

(51) Int. Cl.
*B65H 31/00* (2006.01)
*H04N 1/00* (2006.01)

(52) U.S. Cl.
CPC ......... *B65H 31/00* (2013.01); *H04N 1/00405* (2013.01); *H04N 1/0049* (2013.01);
(Continued)

(58) Field of Classification Search
CPC ............ H04N 1/0049; H04N 1/00631; B65H 2405/1115; B65H 2405/1113;
(Continued)

(56) References Cited

U.S. PATENT DOCUMENTS 8,988,739 B2 3/2015 Oshida
9,723,160 B2 8/2017 Xie et al.
(Continued)

FOREIGN PATENT DOCUMENTS

CN 105460672 A 4/2016
JP H08339107 A 12/1996
(Continued)

OTHER PUBLICATIONS

Non-Final Rejection of U.S. Appl. No. 16/601,118 dated Jun. 15, 2021.
(Continued)

*Primary Examiner* — Jeremy R Severson
(74) *Attorney, Agent, or Firm* — ScienBiziP, P.C.

(57) ABSTRACT

A document feeder includes a document placing tray on which a document is placed; a document discharging tray on which a document discharged from a document discharging port in a discharging direction is stacked; and a light source that radiates light to the document discharging tray. The document discharging tray is disposed below the document placing tray. The document discharging tray has a protruding portion protruding upward from the surrounding area. The light source is disposed within a region having a width that is the same as a document having a maximum size in the width direction.

7 Claims, 9 Drawing Sheets

Related U.S. Application Data division of application No. 16/601,118, filed on Oct. 14, 2019, now Pat. No. 11,319,180.

(52) U.S. Cl.
CPC ............. *B65H 2405/1113* (2013.01); *B65H 2405/1115* (2013.01); *B65H 2515/60* (2013.01); *H04N 1/0057* (2013.01); *H04N 2201/0081* (2013.01); *H04N 2201/02495* (2013.01)

(58) Field of Classification Search
CPC .... B65H 2405/1131; B65H 2405/1111; B65H 2405/1112; B65H 2515/60; B65H 31/00
See application file for complete search history.

(56) References Cited

U.S. PATENT DOCUMENTS

| | | | | |
|---|---|---|---|---|
| 9,944,489 | B2* | 4/2018 | Arikawa | ............... B65H 31/02 |
| 11,319,180 | B2 | 5/2022 | Fukutome et al. | |
| 2011/0096379 | A1 | 4/2011 | Kurokawa | |
| 2013/0050780 | A1 | 2/2013 | Matsumoto | |
| 2013/0242356 | A1 | 9/2013 | Oshida | |
| 2016/0309046 | A1 | 10/2016 | Xie et al. | |

FOREIGN PATENT DOCUMENTS

| | | |
|---|---|---|
| JP | 2008010902 A | 1/2008 |
| JP | 2013062793 A | 4/2013 |
| JP | 2013197725 A | 9/2013 |
| JP | 2016204091 A | 12/2016 |

OTHER PUBLICATIONS

Notice of Allowance of U.S. Appl. No. 16/601,118 dated Jan. 3, 2022.

Notice of Allowance of U.S. Appl. No. 17/708,430 dated Nov. 21, 2022.

* cited by examiner

DOCUMENT FEEDER AND IMAGE FORMING APPARATUS

BACKGROUND OF THE INVENTION

Field of the Invention

The present invention relates to a document feeder that transports a document and an image forming apparatus.

Description of the Background Art

A known document feeder disposed in an image forming apparatus takes in a document placed on an input tray, and outputs the document into an output tray after the document is read. In the document feeder, the input tray is disposed above the output tray. Consequently, the output tray is dark, and sometimes the user fails to notice documents output into the dark output tray. A light source that emits light to the output tray has been proposed to prevent such a document to be left unnoticed (for example, Japanese Unexamined Patent Application Publication No. 2013-197725).

The image reader according to Japanese Unexamined Patent Application Publication No. 2013-197725 includes a document chute that holds documents; a document transporter that transports a document placed on the document chute; a document stacker that is disposed directly below the document chute, and receives a document output by the document transporter; and an illuminating unit (illuminating lamp) that is disposed below the document chute, and radiates light onto the document stacker. The illuminating unit is disposed orthogonal to the document transport direction and in an area outside the document path for a document having the maximum size. In the image reader, light is radiated on the document stacker but not on the document. The document not illuminated with light is unnoticeable.

An object of the present invention, which has been conceived to solve the issue described above, is to provide a document feeder and an image forming apparatus that can spotlight a document so as to make the document more noticeable by a user.

SUMMARY OF THE INVENTION

A document feeder according to the present invention includes a document placing tray on which a document is placed; a document discharging tray disposed below the document placing tray, the document discharged from a document discharging port in a discharging direction being stacked in the document discharging tray; and a light source disposed below the document placing tray and radiating light to the document discharging tray, the document discharging tray having a protruding portion protruding farther upward than a surrounding area, the light source being disposed in a width direction orthogonal to the discharging direction in a region having a width smaller than the width of a document having a maximum size.

In the document feeder according to the present invention, the apex of the protruding portion and the light source may be disposed in a region located on a further front side of the document feeder in comparison with a center of the document discharging tray in the width direction and extending to a position corresponding to an edge of the document having a maximum size.

In the document feeder according to the present invention, the light source may be disposed in the width direction in a region from an end of the protruding portion on a front side of the document feeder to an edge of the document having a maximum size on the front side of the document feeder.

In the document feeder according to the present invention, the document placing tray may have a cutout portion on an edge that is located downstream in the discharging direction and on a front side of the document feeder in the width direction, and the light source may be disposed on a peripheral edge along the cutout portion.

In the document feeder according to the present invention, the light source may be disposed at a position on the document placing tray within the width of the cutout portion in the discharging direction.

In the document feeder according to the present invention, the cutout portion may be so provided in the width direction as to extend farther rearward of the document feeder than an end of the protruding portion up to a rear side of the document feeder.

In the document feeder according to the present invention, a transparent or translucent member may be fixed to the cutout portion.

In the document feeder according to the present invention, a wall vertically erected may be disposed at an end of the protruding portion in the width direction.

In the document feeder according to the present invention, the document discharging tray may have a depressed portion depressed farther downward than the surrounding area, and the depressed portion may be disposed adjacent to the protruding portion in the width direction.

The document feeder according to the present invention may further include a vertical wall disposed on a front side of the document feeder in the width direction along a periphery of the document feeder, in which the vertical wall is lower than an apex of the protruding portion.

A document feeder according to the present invention includes a document placing tray on which a document is placed; a document discharging tray disposed below the document placing tray, the document discharged from a document discharging port along the discharging direction being stacked in the document discharging tray; and a light source disposed below the document placing tray and radiating light to the document discharging tray, wherein the document placing tray includes a cutout portion on an edge that is located downstream in the discharging direction and on a front side of the document feeder in the width direction, and the light source is disposed at a position on the document placing tray overlaying the cutout portion in the discharging direction.

An image forming apparatus according to the present invention includes the document feeder according to the present invention.

According to the present invention, a document stacked on a document discharging tray is irradiated with light. Thus, the document is noticeable, and the user is provided with a better view of the document. The document discharging tray has a protruding portion that lifts a portion of the document, causing the document to curve. This causes light to be reflected at the document in a way that makes the document noticeable by the user.

DESCRIPTION OF THE PREFERRED EMBODIMENTS

First Embodiment

An image forming apparatus according to a first embodiments of the present invention will now be described with reference to the accompanying drawings.

Figure 1:
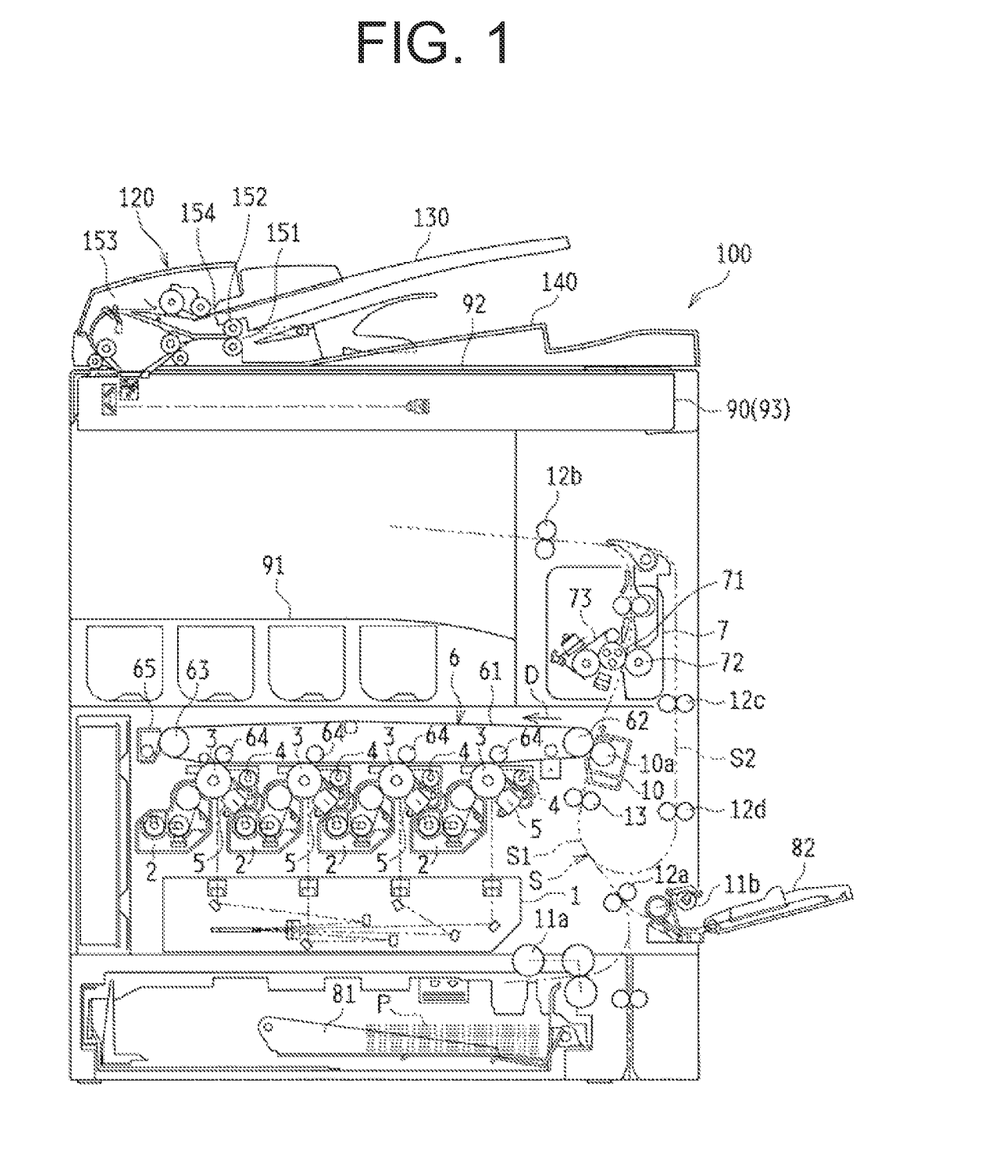
FIG. 1 is a schematic side view of an image forming apparatus according to a first embodiment of the present invention.

FIG. 1 is a schematic side view of an image forming apparatus 100 according to the first embodiment of the present invention.

The image forming apparatus 100 is a multifunction peripheral functioning as a scanner, a copier, a printer, a facsimile machine, etc. The image forming apparatus 100 sends an image of a document read by an image reader 90 to an external device (i.e., functions as a scanner), and forms a multicolor or monochrome image of the read document or an image received from an external device on a sheet (i.e., functions as a copier, a printer, and a facsimile machine).

The image reader 90 supports an automatic document feeder (an Auto Document Feeder (ADF)) 120 so as to allow the document feeder 120 to be freely opened and closed. The image reader 90 includes an image reading unit 93 including a light source or an image pickup device, and reads an image of a document. When the document feeder 120 is opened, a document table 92 in the upper portion of the image reader 90 is exposed to allow a document (sheet) to be manually placed on the document table 92. The document feeder 120 automatically transports the document as placed to the image reader 90. The image reader 90 reads the manually placed document or the document transported by the document feeder 120, and generates image data. Note that the detailed structure of the document feeder 120 will be described below with reference to FIGS. 2 to 5.

The image forming apparatus 100 includes an exposure unit 1, developing units 2, photosensitive drums 3, cleaners 4, chargers 5, an intermediate-transfer-belt unit 6, a fixing unit 7, a sheet feeder tray 81, a manual feed tray 82, a sheet output tray 91, and a sheet path S. The image forming apparatus 100 forms a multicolor or monochrome image on a predetermined sheet in accordance with image data from an external device.

The image data processed by the image forming apparatus 100 corresponds to a color image in the colors black (K), cyan (C), magenta (M), and yellow (Y). Hence, four image stations are provided to form four latent images in black, cyan, magenta, and yellow. The image stations for the respective colors each includes a developing unit 2, a photosensitive drum 3, a charger 5, and a cleaner 4.

The photosensitive drums 3 are disposed at the substantial center of the image forming apparatus 100. The chargers 5 uniformly charge the surfaces of the corresponding photosensitive drums 3 to a predetermined potential. The exposure unit 1 exposes the surfaces of the photosensitive drums 3 to form electrostatic latent images. The developing units 2 develop the corresponding electrostatic latent images on the surfaces of the corresponding photosensitive drums 3, and form toner images on the surfaces of photosensitive drums 3. Through the series of operations described above, toner images of the respective colors are formed on the surfaces of the photosensitive drums 3. The cleaners 4 remove and collect the toners remaining on the surfaces of the photosensitive drums 3 after development and image transfer.

An intermediate-transfer-belt unit 6 is disposed above the photosensitive drums 3, and includes an intermediate transfer belt 61, an intermediate-transfer-belt driving roller 62, an intermediate-transfer-belt driven roller 63, intermediate rollers 64, and an intermediate-transfer-belt cleaner 65. Four intermediate transfer rollers 64 are provided for the image station for YMCK colors.

The intermediate transfer belt 61 is extended across the intermediate-transfer-belt driving roller 62, the intermediate-transfer-belt driven roller 63, and the intermediate transfer rollers 64, such that the surface of intermediate transfer belt 61 is moved in a predetermined direction (direction of arrow D in the drawing) by the rollers.

While the intermediate transfer belt 61 moves in the direction of arrow D, the intermediate-transfer-belt cleaner 65 removes and collects the residual toners, and the toner images of the respective colors on the surfaces of the photosensitive drums 3 are sequentially transferred and overlaid with each other on the surface of the intermediate transfer belt 61 so as to form a color toner image on the surface of the intermediate transfer belt 61.

The image forming apparatus 100 further includes a secondary transfer unit 10 including a transfer roller 10a. A nip is defined between the transfer roller 10a and the intermediate transfer belt 61. A sheet transported through the sheet path S is fed through the nip. When the sheet passes through the nip, the color toner image on the surface of the intermediate transfer belt 61 is transferred onto the sheet.

The sheet feeder tray 81 stores sheets to be used for image formation, and is disposed below the exposure unit 1. The manual feed tray 82 is disposed on a side face of the image forming apparatus 100 so as to be freely opened and closed. When the manual feed tray 82 is opened, sheets to be used for image formation can be placed in the manual feed tray 82. The document discharging tray 91 is disposed in the upper portion of the image forming apparatus 100, and receives the sheets on which images have been formed.

The sheet path S includes an S-shaped main path S1, and a reverse path S2 that branches from the main path S1 and rejoins the main path S1. A pickup roller 11a, a manual-feed pickup roller 11b, pre-registration rollers 12a, registration rollers 13, the secondary transfer unit 10, the fixing unit 7, and output rollers 12b are disposed along the main path S1. The reverse path S2 branches from the main path S1 between the fixing unit 7 and the output rollers 12b, passes through reverse rollers 12c and 12d, and rejoins the main path S1 between the pre-registration roller 12a and the registration rollers 13.

The pickup roller 11a is a lead-in roller that is disposed near the end of the sheet feeder tray 81, and feeds each sheet in the sheet feeder tray 81 to the sheet path S. The registration rollers 13 temporarily hold the sheet transported from the sheet feeder tray 81, and feeds the sheet to the transfer roller 10a at a timing that aligns the front edge of the sheet and the front edge of the toner image on the photosensitive drums 3. The pre-registration rollers 12a are small auxiliary rollers that support the transportation of the sheet.

The fixing unit 7 includes a fixing roller 71, a pressing roller 72 that presses the fixing roller, and a heater 73 that heats the fixing roller 71. The fixing unit 7 receives the sheet having the unfixed toner image. The sheet is transported between the fixing roller 71 and the pressing roller 72 for fixing. The sheet having the fixed toner image is output by the output rollers 12b into the document discharging tray 91.

When an image is also to be formed on the back face of the sheet, the output rollers 12b send the sheet in the opposite direction into the reverse path S2, where the sheet is flipped over. The flipped sheet is resent to the registration rollers 13. An image is formed on the back face of the sheet in the same manner as that formed on the front face. The sheet is then discharged into the document discharging tray 91.

Figure 2:
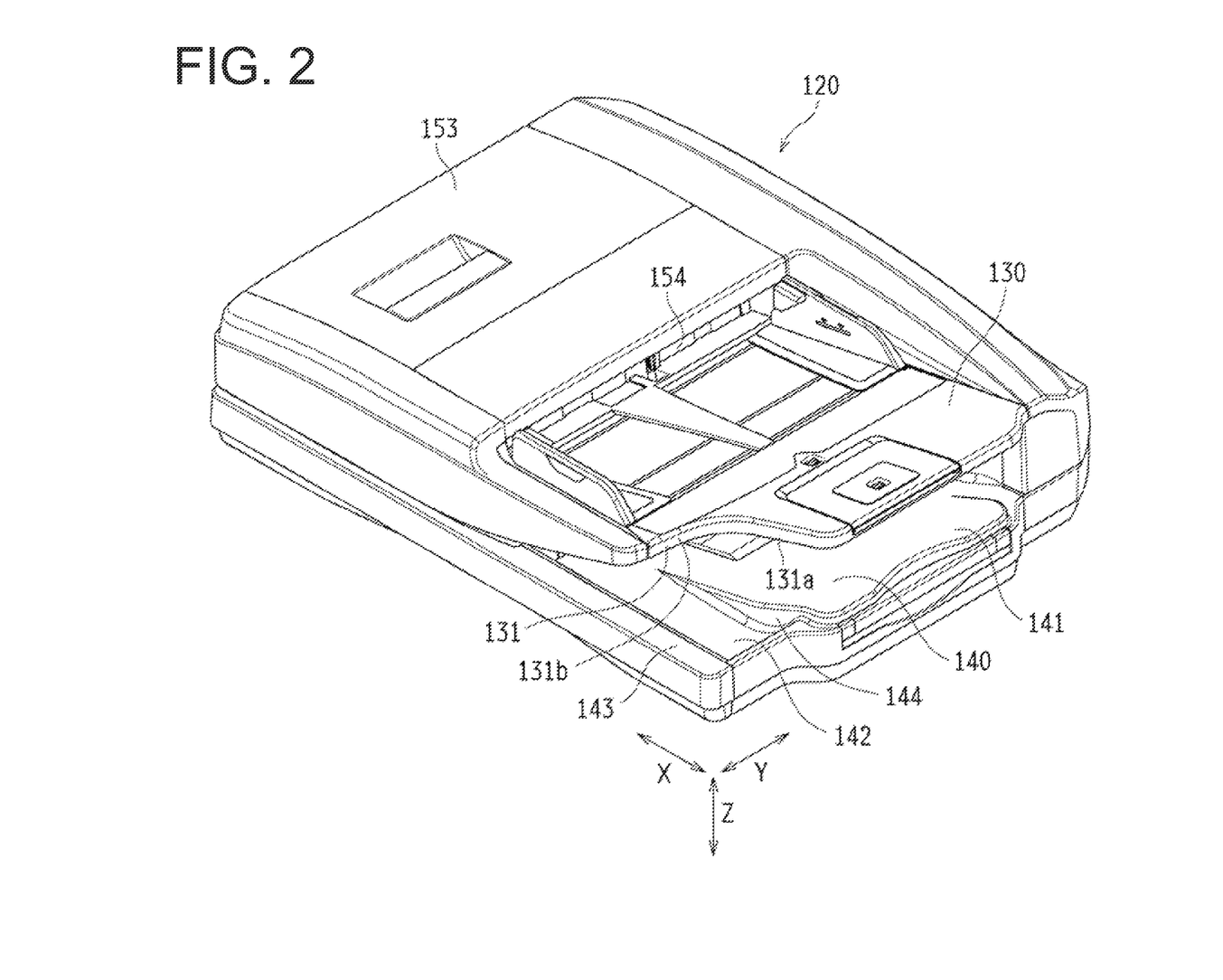
FIG. 2 is a perspective view of a document feeder according to the first embodiment of the present invention.
Figure 3:
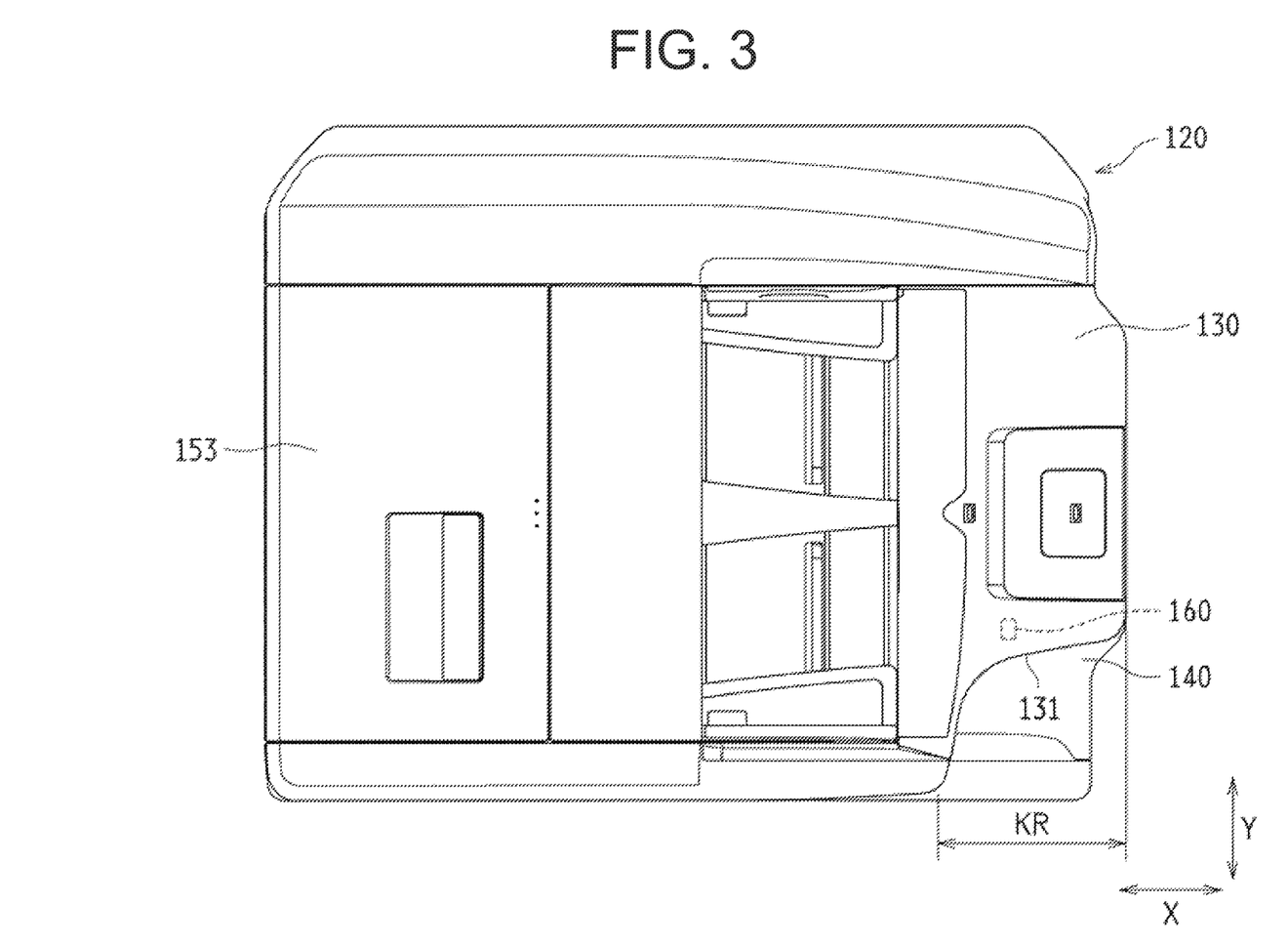
FIG. 3 is a top view of the document feeder illustrated in FIG. 2.
Figure 4:
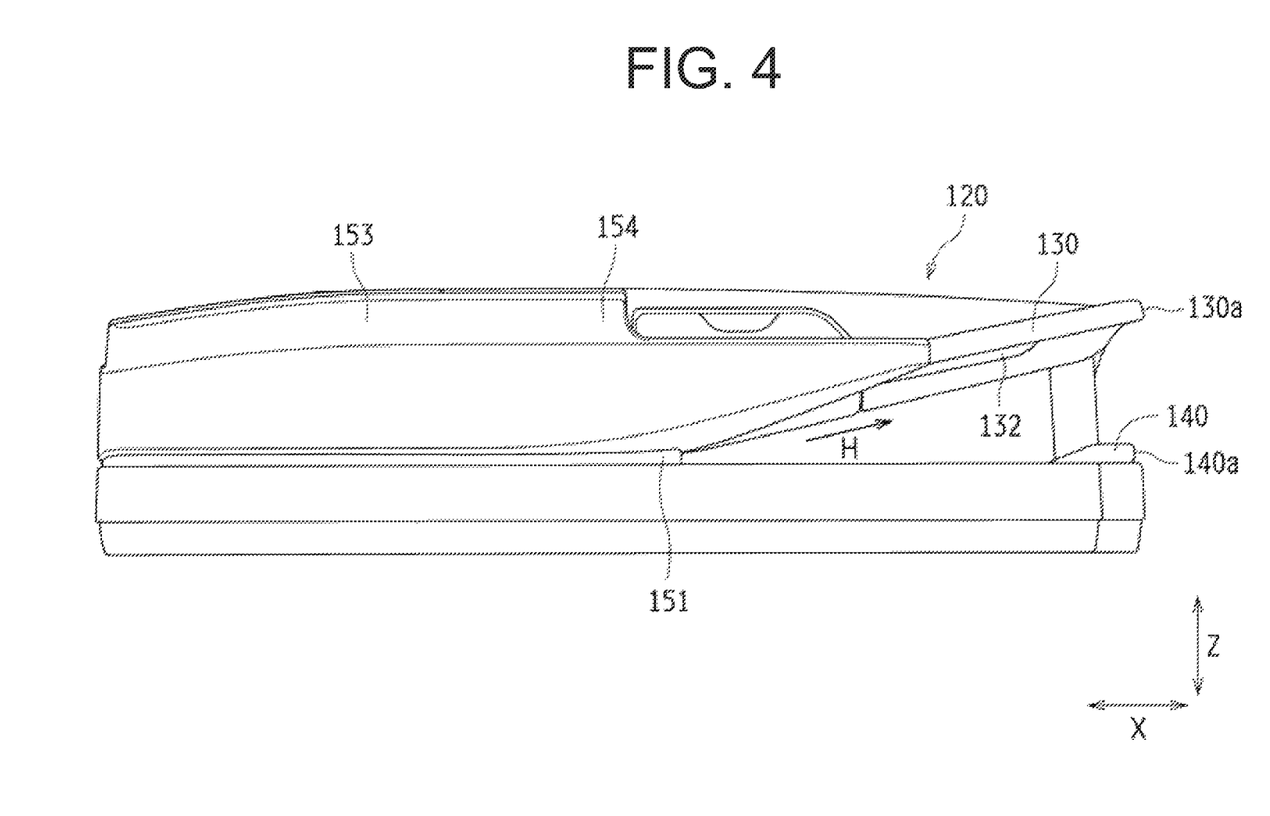
FIG. 4 is a front view of the document feeder illustrated in FIG. 2.
Figure 5:
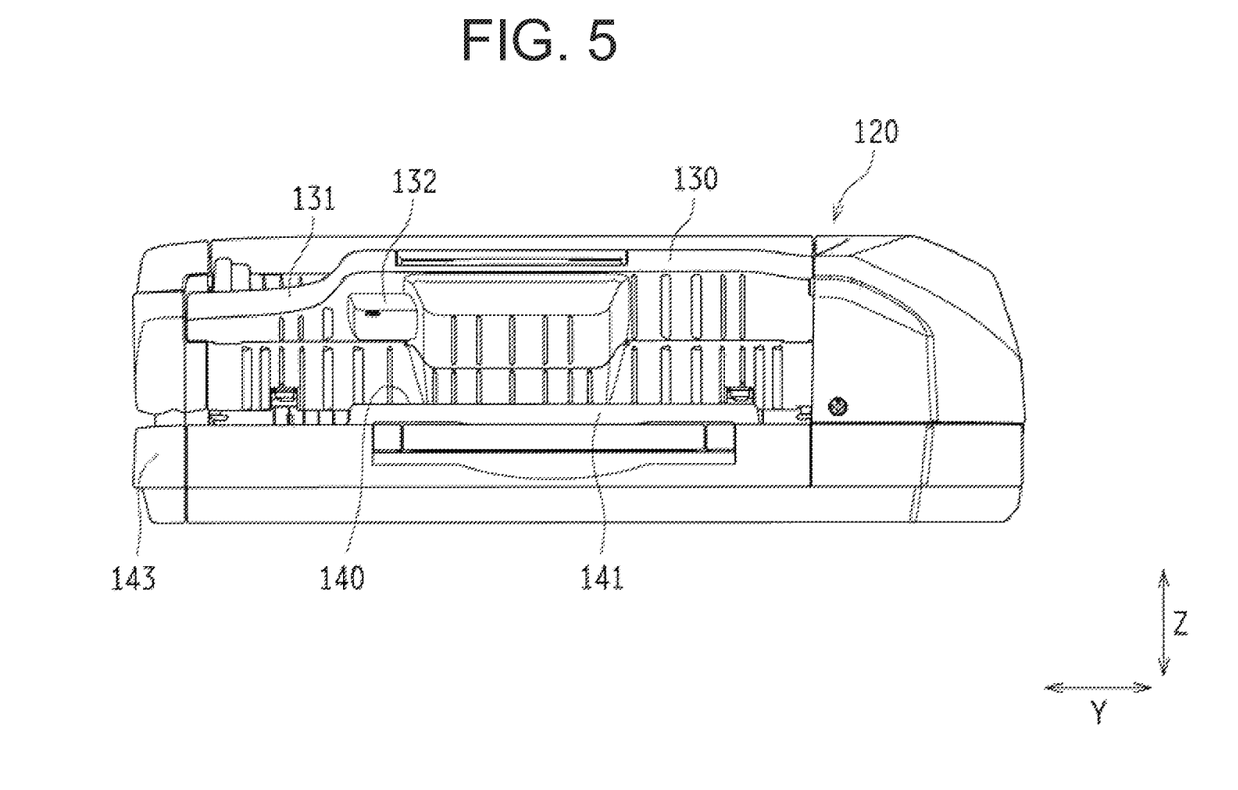
FIG. 5 is a side view of the document feeder illustrated in FIG. 2.

FIG. 2 is a perspective view of the document feeder 120 according to the first embodiment. FIG. 3 is a top view of the document feeder 120 illustrated in FIG. 2. FIG. 4 is a front view of the document feeder 120 illustrated in FIG. 2. FIG. 5 is a side view of the document feeder 120 illustrated in FIG. 2.

The document feeder 120 according to the first embodiment of the present invention includes a document placing tray 130 on which a document is placed, and a document discharging tray 140 on which the document discharged from a document discharging port 151 in a discharging direction H is stacked.

In the document feeder 120, a transporter 153 is disposed at one end (the left end in FIG. 3) in a horizontal direction X (the left-right direction in FIG. 3) along the front side of the document feeder 120, and the document placing tray 130 and the document discharging tray 140 are disposed on the other end (the right end in FIG. 3). A document placing tray 130 and the document discharging tray 140 are disposed adjacent to each other along the height direction Z. The document placing tray 130 is disposed on the top, and the document discharging tray 140 is disposed on the bottom. That is, the document placing tray 130 extends from a document input port 154 disposed in the upper portion of the transporter 153 to the other end of the document feeder 120. The document discharging tray 140 extends from the document discharging port 151 disposed in the lower portion of the transporter 153 to the other end of the document feeder 120. Hence, the input direction (the leftward direction in FIG. 3) of the document transported from the document placing tray 130 is opposite to the discharging direction H (the rightward direction in FIG. 3) of the document transported to the document discharging tray 140.

In the document feeder 120, a document placed on the document placing tray 130 enters the transporter 153 through the document input port 154. The document in the transporter 153 is read by the image reader 90, and discharged from the transporter 153, through the output rollers 152 disposed at the document discharging port 151 onto the document discharging tray 140. In the description below, the direction orthogonal to the discharging direction H may also be referred to as "width direction Y" (the vertical direction in FIG. 3).

The document placing tray 130 is obliquely disposed such that the end adjacent to the document input port 154 is lower than the end (document placing tray extension end 130a) remote from the document input port 154. That is, the document placing tray 130 is obliquely disposed so as to allow a document placed on the document placing tray 130 to slide into the document input port 154 by its own weight.

The document discharging tray 140 is obliquely disposed at substantially the same tilt angle as the document placing tray 130 such that the end (document discharging tray extension end 140a) remote from the document discharging port 151 is disposed higher. When a document is discharged from the document discharging port 151, the document is slightly accelerated in the discharging direction H by the output rollers 152. The accelerated document is prevented from falling out of the document discharging tray 140 by causing the document to slide back toward the document discharging port 151. By sliding back, documents are aligned on the document discharging tray 140. Note that the document placing tray 130 and the document discharging tray 140 may have different tilt angles.

The document placing tray 130 has a cutout portion 131 on the downstream side in the discharging direction H (the right side in FIG. 3) and the edge of the front side of the document feeder 120 in the width direction Y (the bottom side in FIG. 3). The document placing tray 130 overlaps the document discharging tray 140 in plan view (for example, in FIG. 3) such that the document discharging tray 140 is exposed through the cutout portion 131. Note that in the description below, the front side of the document feeder 120 (the image forming apparatus 100) may also be referred to as "forward side" in the width direction Y, and the rear side of the document feeder 120 as "rearward side" (the top side in FIG. 3).

As illustrated in FIG. 3, the document placing tray 130 has a substantially rectangular shape in plan view. The cutout portion 131 is provided in the document placing tray 130 in an area corresponding to a corner of the document placing tray 130. The outer rim of the document placing tray 130 along the cutout portion 131 has a first side 131a more or less extending along the horizontal direction X, and a second side 131b more or less extending along the width direction Y. That is, the first side 131a is disposed on the rearward side (the top side in FIG. 3) of the side of the document placing tray 130 along the horizontal direction X (the bottom side in FIG. 3). The second side 131b is disposed more upstream (the left side in FIG. 3) than the side of the document placing tray 130 along the width direction Y. FIG. 3 illustrates a cutout region KR in the discharging direction H defined by the first side 131a and the second side 131b. The cutout region KR corresponds to the range in which the cutout portion 131 is disposed.

It is presumed that the image forming apparatus 100 is normally operated by a standing user facing the front side of the image forming apparatus 100. Thus, the operation panel, etc., are disposed on the front side. The image forming apparatus 100 is designed to facilitate manual removal document and sheets from the front side.

The bottom face of the document placing tray 130 has a light-source housing 132 accommodating a light source 160 near the cutout portion 131. The light-source housing 132 is disposed near the outer rim of the document placing tray 130 along the cutout portion 131 on the slightly rearward side of the cutout portion 131. The structure the light-source housing 132 will be described with reference to FIG. 6.

The document discharging tray 140 is obliquely disposed such that the document discharging tray extension end 140a is higher than the other end. A tilted face is defined by the tilt angle of the document discharging tray 140. The tilted face of the document discharging tray 140 has a protruding portion 141 and a depressed portion 142 that have partially different heights in the height direction Z. Note that the shapes of the protruding portion 141 and the depressed portion 142 will be described in detail below with reference to FIG. 7.

Figure 7:
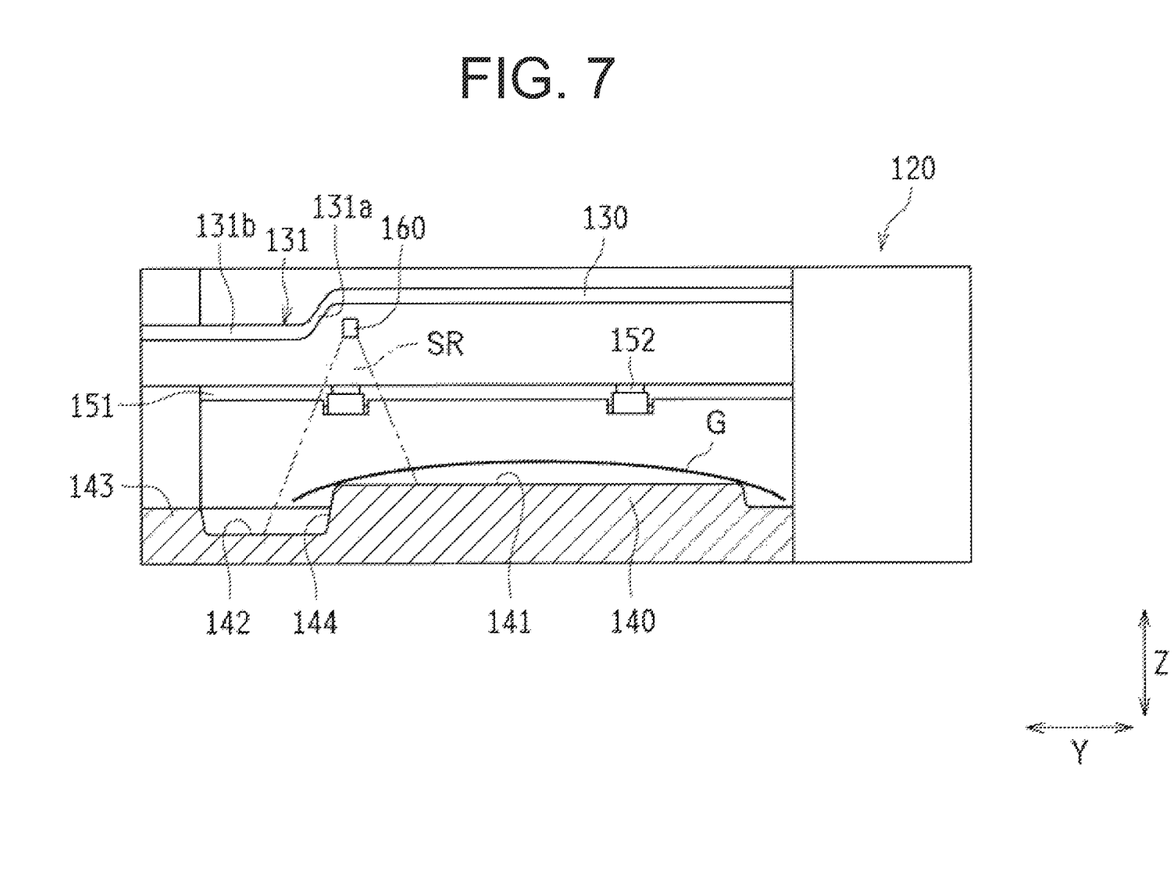
FIG. 7 is a schematic side view of a light source arranged in relation to a document discharging tray.

The document discharging tray 140 has a vertical wall 143 along the outer rim. The vertical wall 143 has a uniform top face that is parallel to the horizontal direction X and the width direction Y. In other words, the vertical wall 143 of the document discharging tray 140 is horizontal and not tilted.

Figure 6:
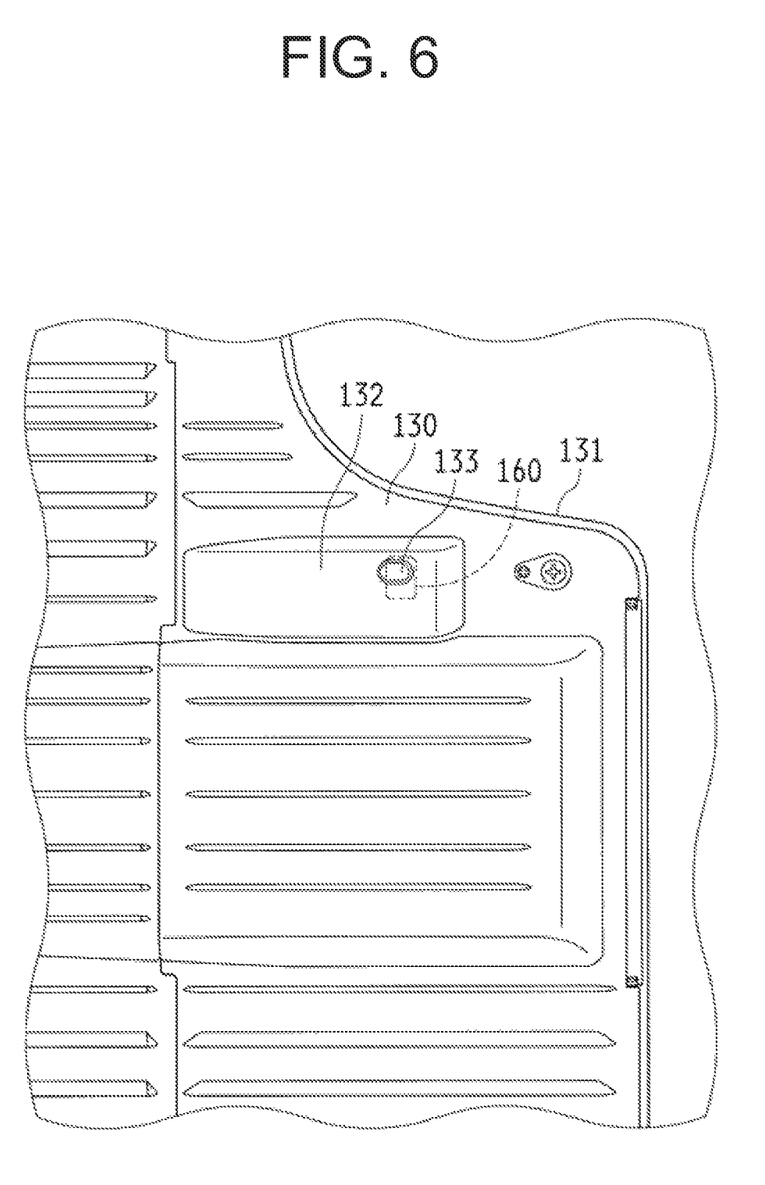
FIG. 6 is an enlarged bottom view of a light-source housing and its vicinity.

FIG. 6 is an enlarged bottom view of the light-source housing 132 and its vicinity.

FIG. 6 illustrates the document placing tray 130 illustrated in FIG. 2, etc., in bottom view. FIG. 6 is an enlarged view of the light-source housing 132 and its vicinity along the first side 131a. The light source 160 is disposed inside the document placing tray 130 so as to face the light-source housing 132. The light-source housing 132 has an opening 133 in the bottom face of the document placing tray 130. A portion of the light source 160 is exposed through the opening. The light source 160 includes a light emitting element, such as a light-emitting diode (LED). The light from the light source 160 passes through the opening 133. The cutout portion 131 of the document placing tray 130 is designed to allow easy access to the space between the document placing tray 130 and the document discharging tray 140, and thus, draws the attention of the user when the user removes a document. By disposing the light source 160 near the cutout portion 131, the emission of light is readily noticeable by the user because it is readily viewed by the user.

FIG. 7 is a schematic side view of the light source 160 arranged in relation to the document discharging tray 140.

FIG. 7 schematically illustrates the document feeder 120 in view from the side of the document discharging tray extension end 140a. Note that the portion of the document discharging tray 140 facing the light source 160 is hatched to emphasize the protruding and depressed portions. In consideration of the visibility of FIG. 7, only one document G is illustrated on the document discharging tray 140. However, any number of documents G may be disposed on the document discharging tray 140. The document G illustrated in FIG. 7 has the largest length in the width direction Y among the lengths of the documents G transportable by the document feeder 120.

The protruding portion 141 protruding farther upward than the surrounding area is disposed at the substantial center of the document discharging tray 140 in the width direction Y. The depressed portion 142 is disposed adjacent to forward side of the protruding portion 141 (the left side in FIG. 7). The vertical wall 143 is disposed on the outer rim of the document feeder 120 along the edge on the forward side. In other words, the depressed portion 142 is disposed between the vertical wall 143 and the protruding portion 141. In the cross-sectional view in FIG. 7, the protruding portion 141 is the highest in the height direction Z, the vertical wall 143 is the second highest, and the depressed portion 142 is the lowest.

In this embodiment, a portion of the document discharging tray 140 wide in the width direction Y constitutes the protruding portion 141. The protruding portion 141 has a trapezoidal cross-section. In the cross-sectional view in FIG. 7, the protruding portion 141 has an apex disposed at a substantially constant height. The end of the protruding portion 141 in the width direction Y defines a steep edge. The height difference between the protruding portion 141 and the depressed portion 142 defines an even steeper edge, at which a wall 144 connects the protruding portion 141 and the depressed portion 142 in the height direction Z. Note that the wall 144 and the top face of the protruding portion 141 do not have to be disposed perpendicular to each other, and may be disposed at an oblique angle to each other. The upper and lower edges of the wall 144 may be rounded to prevent the document G from being stuck.

The protruding portion 141 is disposed slightly rearward to the substantial center of the document discharging tray 140 in the width direction Y. The length of the protruding portion 141 in the width direction Y is smaller than that of the document having the maximum size. Most of the area of the document G placed on the document discharging tray 140 overlays the protruding portion 141 in the width direction Y, but a small end portion of the document G extends outward from the end of the protruding portion 141. The portion of the document G extending over the protruding portion 141 to the forward side is disposed above the wall 144 and the depressed portion 142, and sags downward due to the height difference between the protruding portion 141 and the depressed portion 142. This causes the document G is curve in a convex shape.

The first side 131a of the cutout portion 131 is disposed at substantially the same position as that of the wall 144 in the width direction Y. The light source 160 is disposed near the first side 131a. The light from the light source 160 illuminates the document discharging tray 140 (the lower portion). The dashed-dotted lines in FIG. 7 indicate the area illuminated by the light from the light source 160 (irradiation range SR). The boundary between the protruding portion 141 and the depressed portion 142 and its vicinity are included in the irradiation range SR in the width direction Y. Note that the irradiation range SR in the discharging direction H may be appropriately determined. It is desirable to establish the irradiation range SR to include both the document discharging tray 140 and the document G placed on the document discharging tray 140.

A portion of the document discharging tray 140 in the irradiation range SR is illuminated with light. This portion includes regions of different brightnesses (reflections) depending on the positional with the light source 160. In specific, the protruding portion 141, which is disposed close to the light source 160 in the height direction Z, appears relatively bright. In contrast, the depressed portion 142, which is disposed at a position lower than the protruding portion 141, appears slightly darker than the protruding portion 141. The wall 144 is disposed at an angle that is almost parallel to the irradiation direction of the light from the light source 160. Thus, the wall 144 has a weak reflection, and appears darker than the depressed portion 142. A portion of the document G lifted by the protruding portion 141 and curves. This causes the document G to reflect the light and be noticeable to the user. The document discharging tray 140 not only is illuminated with light from the light source 160 but also provided with the protruding portion 141 and the depressed portion 142. This causes a difference in the brightness of the irradiation range SR and emphasizes the incident light. Hence, the user is provided with a better view of the document.

As illustrated in FIG. 7, the region including the apex of the protruding portion 141 and the light source 160 extends in the width direction Y to a position on the forward side of the document discharging tray 140 corresponding to the edge of a document G having a maximum size. In this way, the light source 160, etc., can be disposed on the forward side of the document feeder 120 to make the document G stand out and provide the user with a better view.

In the configuration illustrated in FIG. 7, the cutout portion 131 and the end of the protruding portion 141 (the wall 144) are disposed at substantially same positions in the width direction Y. Alternatively, the cutout portion 131 may be disposed farther rearward than the end of the protruding portion 141 in the width direction Y. In this way, the protruding portion 141 can be visible even from a position higher than the document feeder 120. Thus, the radiated light is readily noticeable.

In this embodiment, the vertical wall 143, which prevents the document G from falling out, has a shape that allows the user to view the light illuminating the document discharging tray 140. The vertical wall 143 should have a height smaller than the height of the apex of the protruding portion 141, and larger than the height of the surrounding areas.

The document discharging tray 140 may include an auxiliary tray that can be pulled out in the downstream direction from the document discharging tray extension end 140a to increase the area on which documents are to be stacked. Such an auxiliary tray does not have to be illuminated with light from the light source 160. Thus, the auxiliary tray does not have to be included the irradiation range SR.

In this embodiment, the maximum size of a document is an A3 size (297×420 mm) in which the length in the width direction Y is 297 mm. Note that, for the image forming apparatus 100, the maximum size of the document may be an A4 size (297×210 mm) in which the length in the width direction Y is 297 mm. In other words, the maximum size of the document transportable in the image forming apparatus 100 is determined by the specifications of the image forming apparatus 100 (document feeder 120).

The cutout portion 131 may be covered with a cover piece. The cover piece may be transparent or translucent so that the document placed below the cutout portion 131 is visible.

Second Embodiment

An image forming apparatus (document feeder) according to a second embodiments of the present invention will now be described with reference to the accompanying drawings. The structure of the image forming apparatus according to the second embodiment is substantially the same as that of the first embodiment. Thus, the same reference numerals are used and redundant description and drawings are omitted.

Figure 8:
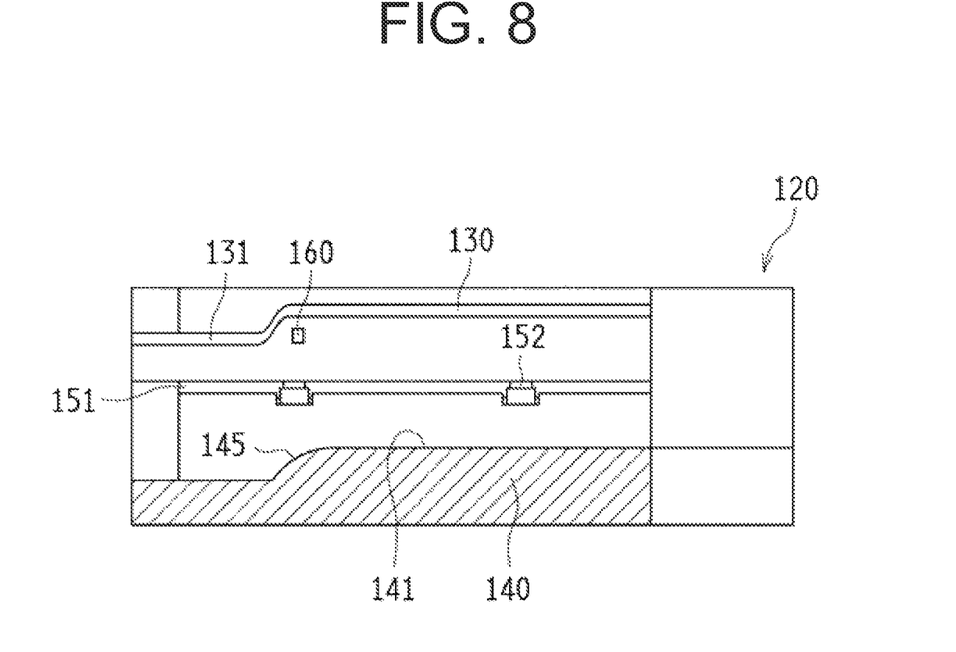
FIG. 8 is a schematic side view of a light source arranged in relation to a document discharging tray according to a second embodiment of the present invention.

FIG. 8 is a schematic side view of a light source 160 arranged in relation with a document discharging tray 140 according to a second embodiment of the present invention.

FIG. 8, like FIG. 7, schematic illustrates a document feeder 120 from the side of a document discharging tray extension end 140a. The portion of the document discharging tray 140 facing the light source 160 is hatched to emphasize the protruding and depressed portions.

The protruding and depressed portions of the document discharging tray 140 according to the second embodiment differ from those according to the first embodiment. In specific, the document discharging tray 140 according to the second embodiment has a protruding portion 141, but does not have a depressed portion 142. The protruding portion 141 has a curved face 145 at the forward edge that has a slope that increases from the top to the bottom. In the first embodiment, the protruding portion 141 has the wall 144 that defines a steep edge. In the second embodiment, the protruding portion 141 has the curved face 145 to smoothen the edge. The curved face 145 increases the length of the portion that has a gradually varying height in the width direction Y. Thus, documents G having different sizes can be disposed on the document discharging tray 140 while extending over the protruding portion 141. In this configuration, the face of the protruding portion 141 extending to the curved face 145 corresponds to an apex. Although not illustrated, a vertical wall 143 and a depressed portion 142 may be appropriate provided in this embodiment.

Third Embodiment

An image forming apparatus (document feeder) according to a third embodiments of the present invention will now be described with reference to the accompanying drawings. The structure of the image forming apparatus according to the third embodiment is substantially the same as those of the first and second embodiments. Thus, the same reference numerals are used and redundant description and drawings are omitted.

Figure 9:
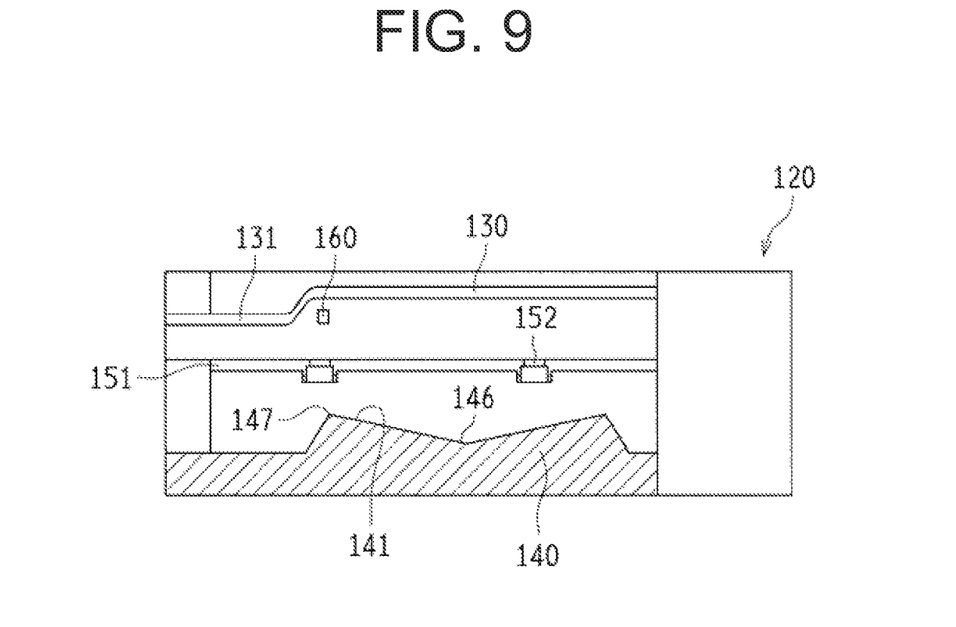
FIG. 9 is a schematic side view of a light source arranged in relation to a document discharging tray according to a third embodiment of the present invention.

FIG. 9 is a schematic side view of a light source 160 arranged in relation with a document discharging tray 140 according to the third embodiment of the present invention.

FIG. 9, like FIG. 7, schematic illustrates a document feeder 120 from the side of a document discharging tray extension end 140a. The portion of the document discharging tray 140 facing the light source 160 is hatched to emphasize the protruding and depressed portions.

The shape of a protruding portion 141 according to the third embodiment differs from that according to the second embodiment. In specific, the protruding portion 141 according to the third embodiment has a low protrusion 146 that is depressed downward relative to an apex or protrusion top 147. That is, the protruding portion 141 may have a non-uniform height, i.e., an uneven top face. The highest portion of the top face in the height direction Z defines the protrusion top 147. In this embodiment, the low protrusion 146 is a tilted face. Alternatively, the low protrusion 146 may be a groove or a curved face. FIG. 9 illustrates the structure including a downward depression. Alternatively, as in the modification illustrated in FIG. 10, the protruding portion 141 may have upward protrusions.

Figure 10:
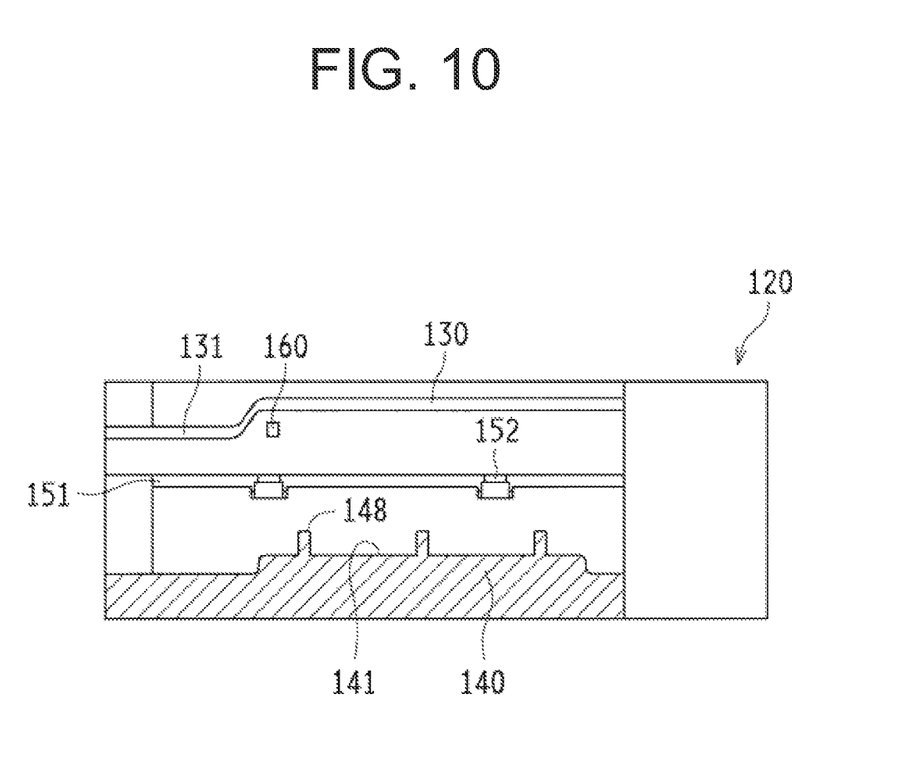
FIG. 10 is a schematic side view of a light source arranged in relation to a document discharging tray according to a modification of the third embodiment of the present invention.

FIG. 10 is a schematic side view of a light source 160 arranged in relation with a document discharging tray 140 according to a modification of the third embodiment of the present invention.

According to the modification, a protruding portion 141 has ribs 148 protruding upward. In this configuration, the ribs 148 correspond to the apex of the protruding portion 141. The ribs 148 extend along the discharging direction H on the upper surface of the protruding portion 141. In the modification, three ribs 148 are disposed along the width direction Y with intervals therebetween. In the case of multiple ribs 148, it is desirable that at least one of the ribs 148 be disposed on the forward side of the center of the document discharging tray 140, and extend to a position on the forward side of the document discharging tray 140 corresponding to the edge of a document having a maximum size.

Note that the embodiments disclosed herein are illustrative in all respects and do not serve as a basis for limited interpretation. Therefore, the technical scope of the invention should not be interpreted only by the above-described embodiments, but should be defined based on the description of the scope of claims. Meanings equivalent to the claims and all modifications within the scope are included in the technical scope of the invention.

What is claimed is:

1. An image forming apparatus comprising:
a transporter discharging a sheet, which has been transported, from a sheet discharging port;
a discharging tray on which the sheet discharged from the sheet discharging port in a discharging direction is stacked; and
a light source disposed above the discharging tray and radiating light to a lower portion, wherein
the discharging tray includes a protruding portion protruding farther upward than a surrounding area,
the protruding portion overlaps the light source in a width direction orthogonal to the discharging direction, and a length of the protruding portion in the width direction is smaller than a length of a sheet having a maximum size to be discharged,
when the sheet having the maximum size is discharged from the sheet discharging port, an end portion of the sheet having the maximum size extends outward from the protruding portion in the width direction, and
the light source is disposed, in the width direction, in a region from a center portion of the sheet having the maximum size to be discharged to an edge of the sheet having the maximum size to be discharged, the edge located on a front side of the image forming apparatus.

2. The image forming apparatus according to claim 1, wherein
the protruding portion further overlaps the light source in the discharging direction.

3. The image forming apparatus according to claim 1, wherein
ribs are provided on an upper surface of the protruding portion, and
the light source is disposed so as to face the protruding portion.

4. The image forming apparatus according to claim 1, wherein
the light source is further disposed, in the width direction, in a region from an end of the protruding portion located on the front side of the image forming apparatus to the edge of the sheet having the maximum size located on the front side of the image forming apparatus.

5. The image forming apparatus according to claim 1, wherein
a wall vertically erected is disposed at an end of the protruding portion in the width direction.

6. The image forming apparatus according to claim 1, wherein,
the discharging tray has a depressed portion depressed farther downward than the surrounding area,
the depressed portion is disposed adjacent to the protruding portion in the width direction, and
the light source radiates light to a boundary between the protruding portion and the depressed portion in the width direction.

7. The image forming apparatus according to claim 1, further comprising:
a vertical wall disposed on the front side of the image forming apparatus in the width direction along a periphery of the image forming apparatus, wherein
the vertical wall is lower than an apex of the protruding portion.

* * * * *